US 6,496,239 B2

(12) United States Patent
Seiberle

(10) Patent No.: US 6,496,239 B2
(45) Date of Patent: Dec. 17, 2002

(54) OPTICAL COMPONENT FOR PRODUCING LINEARLY POLARIZED LIGHT

(75) Inventor: Hubert Seiberle, Weil am Rhein (DE)

(73) Assignee: Rolic AG, Basel (CH)

(*) Notice: Subject to any disclaimer, the term of this patent is extended or adjusted under 35 U.S.C. 154(b) by 0 days.

(21) Appl. No.: 09/905,926

(22) Filed: Jul. 17, 2001

(65) Prior Publication Data

US 2002/0027624 A1 Mar. 7, 2002

Related U.S. Application Data

(63) Continuation of application No. 08/667,687, filed on Jun. 21, 1996, now abandoned.

(30) Foreign Application Priority Data

Jul. 11, 1995 (CH) .................................. 2036/95

(51) Int. Cl.[7] .............................................. G02F 1/135
(52) U.S. Cl. ........................................... 349/98; 349/24
(58) Field of Search ................................ 349/117, 121, 349/126, 128, 129, 24, 73, 96

(56) References Cited

U.S. PATENT DOCUMENTS

| 4,974,941 A | 12/1990 | Gibbons et al. |
| 5,157,526 A | 10/1992 | Kondo et al. .................. 359/63 |
| 5,327,285 A | 7/1994 | Faris |
| 5,389,698 A | 2/1995 | Chigrinov et al. |

FOREIGN PATENT DOCUMENTS

| EP | 387 059 | 3/1990 |
| EP | 525 478 | 7/1992 |
| EP | 632 311 | 6/1994 |
| JP | 4-278903 | 10/1992 |

OTHER PUBLICATIONS

Jpn. J. Appl. Phys., vol. 34 (1995) pp. L764–L767, Part 2, No. 6B, Jun. 15, 1995.
Jpn. J. Appl. Phys., vol. 34 (1995) pp. 3240–3249, Part 1, No. 6A, Jun. 15, 1995.
Conference on Lasers and Electro–Optics, May 21, 1990, Technical Digest Series, vol. 7.
Optics Communications, Feb. 32, No. 2 (Feb. 1980).
Jpn. J. Appl. Phys., vol. 31 (1992) pp. 2155–2164, Part 1, No. 7, Jul. 1992.
Abstract for Document B2–EP 525 478.

Primary Examiner—William L. Sikes
Assistant Examiner—Dung Nguyen
(74) Attorney, Agent, or Firm—Finnegan, Henderson, Farabow, Garrett & Dunner, L.L.P.

(57) ABSTRACT

A polarization mask for producing light of locally different polarization from unpolarized or uniformly polarized light. On the light output side, discrete areas with different polarization directions are present, which are either static or switchable. The mask is useful for, among other things, the transfer of polarization pattern onto a PPN layer.

10 Claims, 3 Drawing Sheets

OPTICAL COMPONENT FOR PRODUCING LINEARLY POLARIZED LIGHT

This is a continuation of application Ser. No. 08/667,687, filed Jun. 21, 1996 now abandoned, which is incorporated herein by reference.

BACKGROUND OF THE INVENTION

1. Field

The invention relates to a polarization mask for producing linearly polarized light having a predetermined polarization direction from incident light. The polarization mask is useful in the exposure of polarization-sensitive layers, for the preparation of such components, and for their preferred use. The term "producing" is to be understood for the purposes of this description as denoting both the actual production of linearly polarized light from unpolarized light and changing the polarization direction of incident light which has already been linearly polarized.

2. Description

Various processes and materials have recently become known in which anisotropic material properties are induced by irradiation with linearly polarized light. The anisotropic property—that is, the preferred direction of the material in microscopically small zones—can be varied by location of the polarized light: In addition to optical anisotropy it is more particularly the steric anisotropy which gives these materials their interest for industry. Liquid crystals in contact with a polymer material are oriented in accordance with the preferred direction thereof by the steric anisotropy of such material. These photostructurable polymers are therefore eminently suitable as orientation layers for liquid crystals, it being possible for the orientation direction to be varied in the micrometer range.

U.S. Pat. No. 4,974,941, the contents of which are herein incorporated by reference, describes a process based on a guest-host system wherein a preferred direction is induced by irradiation with linearly polarized light of an appropriate wavelength by the cis-trans-isomerization of dyes. Liquid crystals in contact with a surface thus irradiated are oriented in accordance with this preferred direction. This orientation process is reversible—that is, by further irradiation of the layer with light of a second polarization direction, the orientation direction already written in can be turned again. This reorientation process can be repeated as often as required and is therefore particularly interesting in connection with re-alignable optical memories.

U.S. Pat. No. 5,389,698, the contents of which are herein incorporated by reference, discloses photostructurable orientation layers in which, in contrast to the reversible orientation process hereinbefore described, an irreversible anisotropic polymer network is built up. The optical and orienting properties induced in the network during the exposure with linearly polarized light are photostable and so cannot be further re-oriented by further exposures. These photo-oriented polymer networks (PPN) can therefore be used wherever stable, structured or unstructured LC orientation layers or optical elements such as non-absorptive color filters, linear and cholesteric polarization filters, optical delay layers or the like are needed.

As a rule, in the exposure of a photostructurable orientation layer at least two different polarization states of the light have to be used to write in a definite pattern. Various exposure processes for impressing polarization patterns into photostructurable layers are known at present. All the known processes have the disadvantage that the total information cannot be transmitted in parallel fashion but must be transmitted serially—that is, in more than a single exposure step. The known processes are therefore complex, costly, and time-consuming.

For instance, a scanner can be used to apply the information to the photostructurable layer in dot form. In this case the polarization direction can be varied from dot to dot. However, in the transfer of high-information-content patterns only a very short exposure time is available for each dot if the total exposure time for the pattern is not to exceed acceptable limits. Consequently, the energy necessary for the orientation must be applied to a small region of the layer in a short time, so that the heat loadability of the photostructurable material is severely stressed.

Another possibility, described in U.S. Pat. No. 5,389,698, the contents of which are herein incorporated by reference, is for the layer to be irradiated with polarized light through a mask. This enables all the zones or regions of a layer which have the same orientation direction to be exposed simultaneously. Many different orientation directions can therefore be written into a layer by the use of further masks. An exposure step is necessary in this process for each orientation direction, the transmission direction of the polarization filter having to be adjusted and the mask having to be changed and positioned each time. Positioning the mask is a particularly time-consuming operation.

Since a particular transmission direction of the polarizer is associated with each mask in this stepwise exposure process, the polarizer itself can be part of the mask. A polarizing mask of this kind can be produced in various ways by known technologies, for example, by laminating a film on to a polarization film. A polarizing mask of this kind can be produced in various ways by known technologies, for example, by laminating a film on to a polarization film. A polarizing mask of this kind could be improved if all the necessary polarization directions could be integrated in a single mask so that a complete polarization pattern could be transferred to a photostructurable layer in a single exposure step. A polarization mask of this kind for the preparation of LC orientation layers is mentioned in EP-A-632 311, but no indication is given about how such a polarization mask might be produced. In fact, the stretching process conventional in the preparation of polarization films automatically leads to a consistent polarization direction over large areas.

U.S. Pat. No. 5,327,285, the contents of which are herein incorporated by reference, discloses a process for producing polymerizers having two polarization directions which differ zonewise in the micrometer range. The process is based on the technology for producing polarizer films. The polarizing properties of two polarizer films are extinguished zonewise by chemical or mechanical treatment and stuck together accurately at a 90° offset from one another. However, due to the stringent requirements for positioning the two films and sticking them together the differently polarizing zones cannot be made as small as required. Also, parallax errors caused by the stacking of the relatively thick polarization films on one another limit the number of possible polarization directions to two.

It is the intent of the present invention to provide a polarization mask that enables production of linearly polarized light with zonewise differing polarizing directions.

SUMMARY OF THE INVENTION

The subject invention provides a polarization mask for producing linearly polarized light having a predetermined polarization direction from incident light and having a light input side and light output side. The polarization mask comprises a plurality of zones which are limited from each other on the light output side and which have at least intermittently different polarization directions.

BRIEF DESCRIPTION OF THE FIGURES

Embodiments of the invention will be described hereinafter with reference to the accompanying drawings wherein.

DETAILED DESCRIPTION OF THE INVENTION

Figure 1:
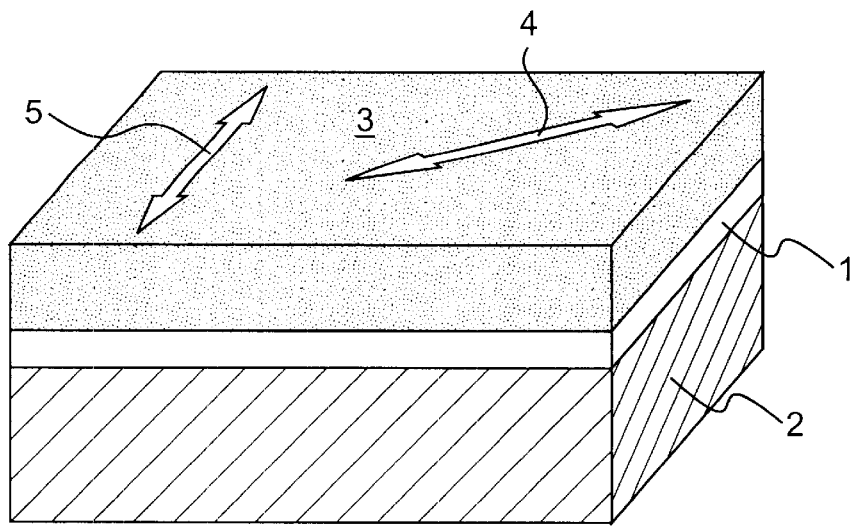
FIG. 1 shows an arrangement for producing a layer of cross-linked LC monomers with differing orientations zonewise.

The subject invention will now be described in terms of its preferred embodiments. These embodiments are set forth to aid in understanding the invention, but are not to be construed as limiting.

The subject invention relates to a polarization mask for producing linearly polarized light having a predetermined polarization direction from incident light. The polarization mask is useful in the exposure of polarization-sensitive layers, for the preparation of such components, and for their preferred use. The term "producing" is to be understood for the purposes of this description as denoting both the actual production of linearly polarized light from unpolarized light and changing the polarization direction of incident light which has already been linearly polarized.

The subject invention provides an optical component that enables linearly polarized light to be produced with zone-wise differing polarization directions for use, for example, in preparing masks that enable a polarization orientation pattern to be written into a polarization-sensitive layer in a single exposure step. To this end, according to the invention, zones are present which are limited from one another on the light output side and which have at least intermittently different polarization directions.

Accordingly, in a preferred embodiment of the invention a liquid crystal layer is so oriented in different directions zonewise that incident light is polarized after passing through the liquid crystal layer, the polarization plane of the light varying in accordance with the orientation pattern.

Preferably, the zones have different powers of optical rotation so that in such zones the polarization plane of incident linear polarized light is rotated through different angles. The term "powers of rotation" is to be understood as denoting herein both the ability of twisted liquid crystals to rotate the polarization direction of the light and also to produce a different polarization direction by birefringency.

The orientation of the liquid crystal layer can be determined either permanently, by a correspondingly structured orientation layer, or dynamically, in a liquid crystal cell which has electrodes. In the latter case the orientation pattern can be altered very simply by electrical activation of the discrete picture dots. The switch feature of these polarization masks provides great flexibility enabling masks to be altered under computer control in fractions of seconds. Individual items of information such as text, numbers or images can therefore be transferred rapidly.

On the other hand, permanency of the polarization pattern can be achieved either by a cross-linked liquid crystal layer on an individual substrate having the orientation layer or by a liquid crystal cell, in which latter case at least one of the two orientation layers of such cell must have a structured orientation.

Since the polarization direction provided by polarization masks having a permanent polarization pattern must be adjustable as required, pixel by pixel, the use of such masks is particularly useful in cases in which it is required to transfer patterns having more than two different polarization directions. Various technologies can be used to produce the structured orientation necessary for this purpose. Preferably, photo-structurable materials exposed through masks with light of a different polarization direction can be used in this case too. Also, this one-off process of preparing polarization masks can be carried out by technologies, for example, rubbing in different directions, the zones which are not to be rubbed being covered, or impressing an orientation pattern with a mechanical stamp, which would be too elaborate for mass-production of orientation layers.

In the case of exposure through a polarizing mask the incident light can be polarized either by a conventional polarizer disposed in front of the liquid crystal layer and having a consistent transmission direction or by doping the liquid crystal layer with dichroic molecules, the same being chosen in accordance with the spectral sensitivity of the photostructurable material.

EXAMPLE 1

Preparation of a Photostructured PPN Layer

Cinnamic acid derivatives can be considered, for example, as PPN material. A material having a high glass point ($T_g$=133° C.) was chosen for the examples having PPN layers:

Photopolymer:

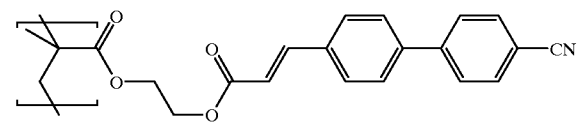

Photopolymer:

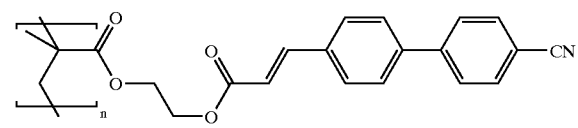

The PPN material was dissolved in NMP to a concentration of 5%. This solution was then used to apply a PPN layer to a glass plate by spincoating at 2000 rpm. The layer was then dried at 130° C. on a heat bench for 2 hours and at 130° C. in vacuo for a room temperature with the linearly polarized light of a 200 W Hg very high pressure lamp, whereafter the layer could be used as an orientation layer for liquid crystals.

EXAMPLE 2

Preparation of a Layer Consisting of Cross-linked LC Monomers (See FIG. 1)

A PPN layer 1 was prepared as in Example 1, the substrate 2 used being a plate of UV-permeable borosilicate glass. The polarization direction of the UV light was offset by 45° for the radiation of the left and right plate half.

As described in U.S. patent application Ser. No. 08/489,865, filed Jun. 13, 1995, the contents of which is herein incorporated by reference, a mixture of cross-linkable LC monomers was dissolved in anisole to a 20% concentration and applied to the exposed PPN layer by spincoating at room temperature.

For the photo-induced cross-linking, the layer was irradiated in vacuo with isotropic light from a 150 W xenon for 30 minutes. The cross-linked liquid crystal layer (LCP) 3 was stable in respect of mechanical, heat and UV stressing. When the cross-linked layer was observed under crossed polarizers it was found to be birefringent. The optical axes 4, 5 of the left and right plate halves formed an angle of 45°. The liquid crystals had taken over the orientation of the PPN layer and retained it during the cross-linking process.

EXAMPLE 3

Figure 2:
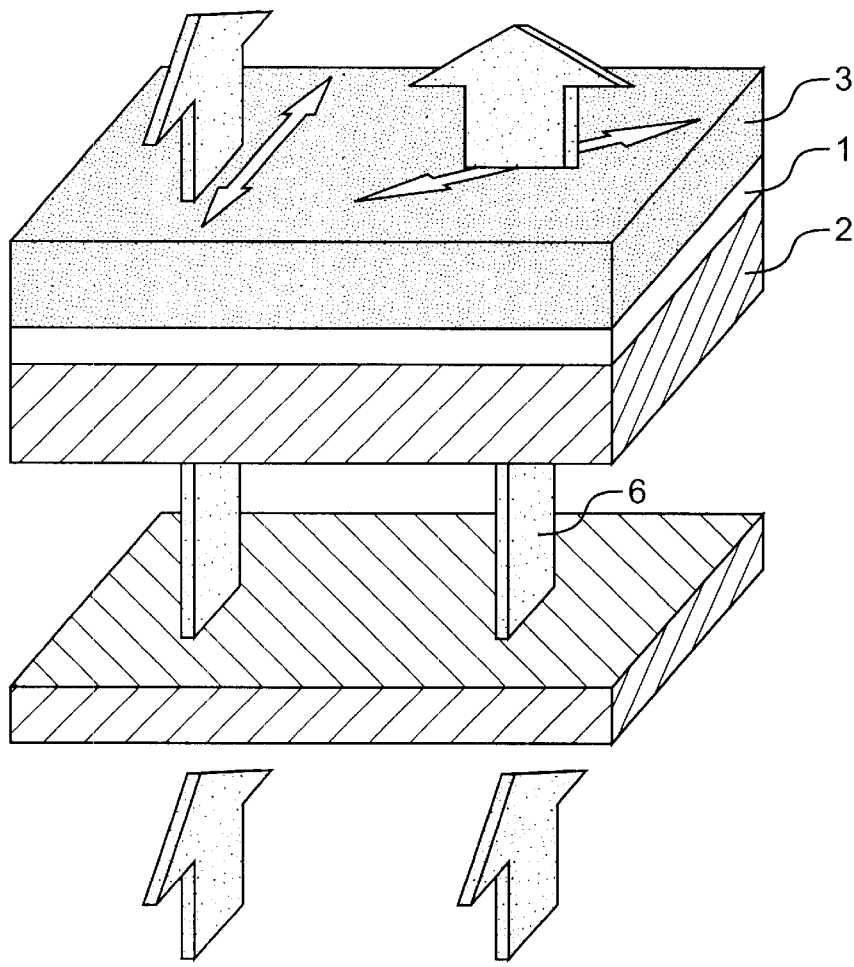
FIG. 2 shows an arrangement in which the layer prepared in accordance with FIG. 1 is used as a birefringent mask.

Exposure of a PPN Layer Through a Birefringent Mask (See FIG. 2)

The optical delay of the layer prepared in Example 2 was approximately 170 nm near the 336 nm mercury line. This plate 1, 2, 3 was then so placed as a birefringent mask on a glass plate coated with the PPN material such that the layer sides contacted one another. The PPN layer was then irradiated through the birefringent mask with polarized UV light 6 having the wave-length 336 nm for 5 minutes. The polarization direction of the UV light was adjusted parallel to the optical axis of the left half of the birefringent mask. The polarization direction of the UV light is therefore maintained in its passage through the left half of the mask while the right plate half acted as a ½ delay plate and thus rotated in the polarization direction through 90°.

After exposure a liquid crystal layer was applied to the PPN layer by spincoating as in Example 2. It was found by means of a tilt compensator that the liquid crystals on the left and right plate halves were perpendicular to one another in the plane of the plate.

Birefringent masks which rotate the polarization plane of the incident light through less than 90° can be prepared similarly. For this purpose the angle between the differently oriented optical axes must be less than. 45°. This method can also be used to produce polarizing masks which have many zones each differing from one another in the direction of their optical axes.

EXAMPLE 4

Figure 3:
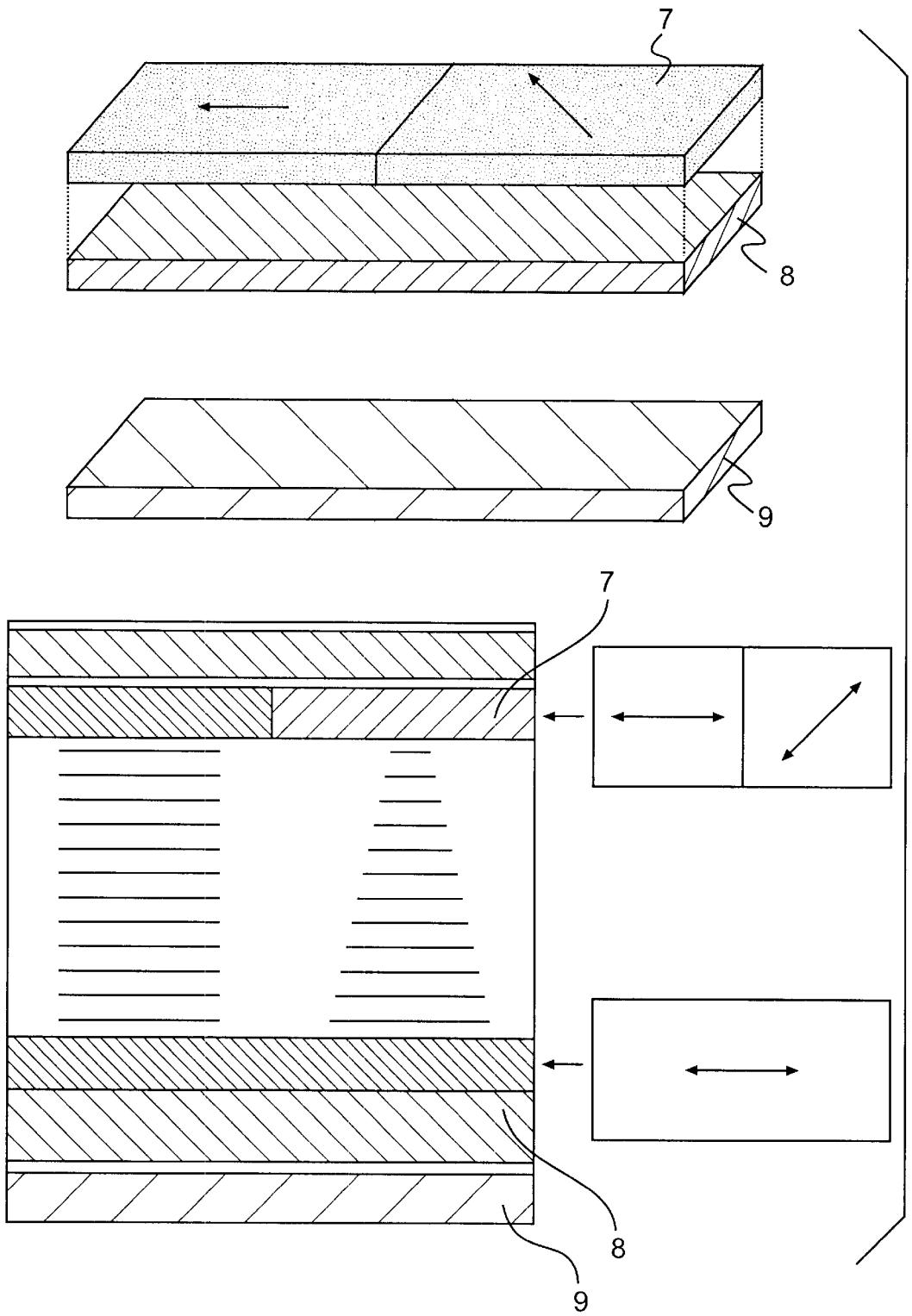
FIG. 3 shows an arrangement in which a structurally oriented LC cell is used as polarization-rotating mask.

Structurally Oriented LC Cell as Polarization-rotating Mask (See FIG. 3)

As in Example 2, a PPN-coated borosilicate glass plate 7 was irradiated with linearly polarized UV light, the polarization direction thereof being rotated through 45° between the irradiation of the left half and right half of the plate. A polyimide orientation layer was applied to a second borosilicate glass plate 8 and the same was rubbed with a cloth parallel to its longitudinal edge. The two glass plates were then combined to form a 6 mm thick LC cell such that the left half of the PPN plate together with the polyimide plate formed a parallel cell. Correspondingly, the orientation directions of the right PPN half and of the polyimide layer formed an angle of 45°. The cell was then filled with a nematic liquid crystal. When a polarizer 9 was placed on the back of the polyimide-coated glass plate with its transmission direction parallel to the direction of rubbing, the left half of the cell was at maximum darkness when the transmission direction of an analyzer above the polarizer was arranged perpendicularly to the transmission direction of the polarizer. However, the right cell half was at maximum brightness when the analyzer was rotated through 45°. Consequently, the polarization plane of the incident light remained unchanged in the passage through the left cell half but was rotated through 45° in the right half.

This cell was mounted by way of the PPN side on another PPN-coated glass plate. The PPN layer was then irradiated through the cell with UV light polarized parallel to the polyimide rubbing direction. A liquid crystal layer was then applied by spincoating to the PPN layer. When the latter layer was observed under crossed polarizers, it was seen that the liquid crystal had been oriented, the orientation direction differing by 45° between the left and right plate halves.

EXAMPLE 5

Figure 4:
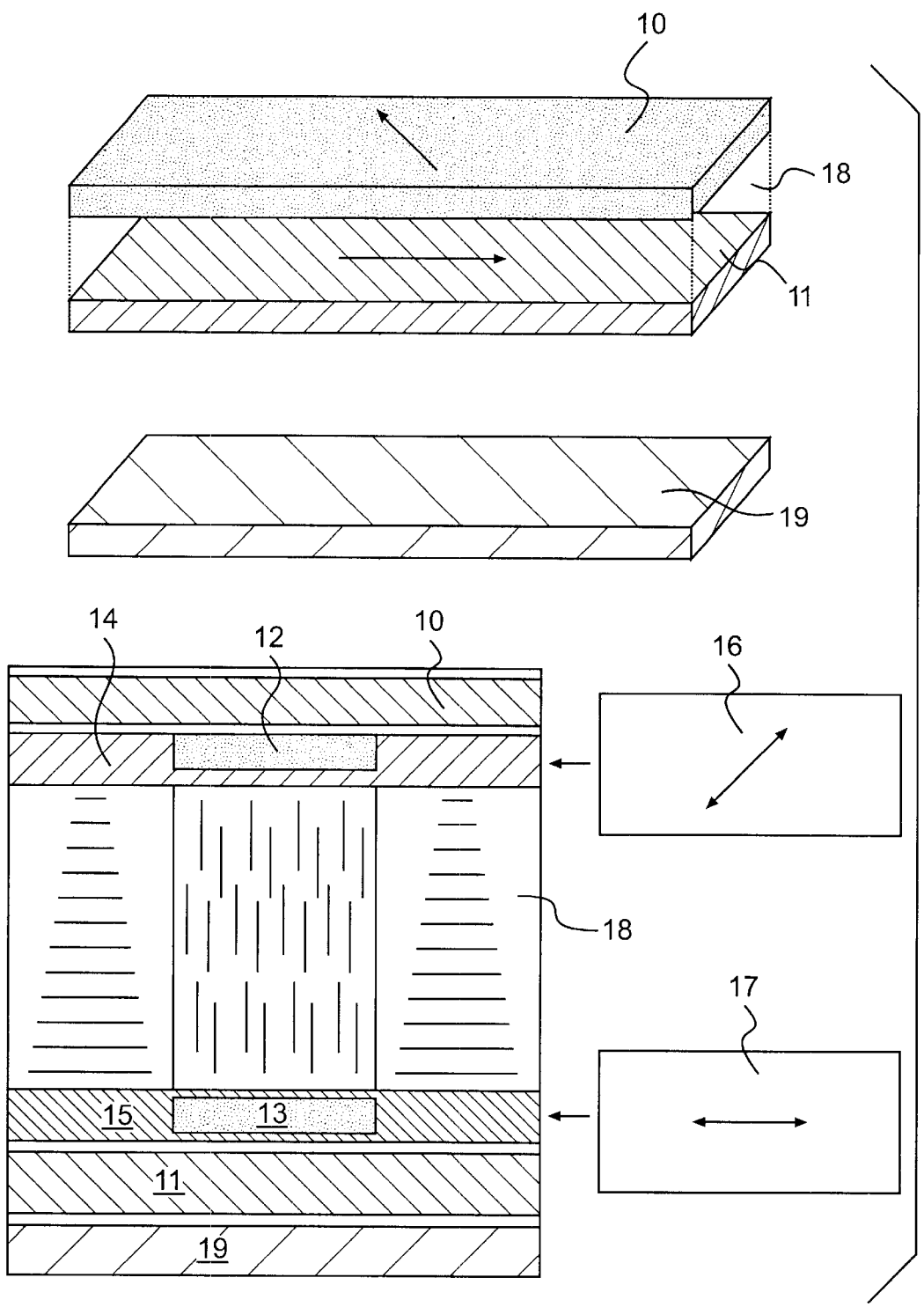
FIG. 4 shows an electrically switchable polarization-rotating mask.

Electrically Switchable Polarization-rotating Mask (See FIG. 4)

Polyimide layers 14, 15 were applied by spincoating to two borosilicate glass plates 10, 11 having 1×1 cm ITO electrodes 12, 13. An orientation direction 16, 17 was predetermined on each plate by rubbing the polyimide layers with a cloth. The rubbing direction differed by 45° between the two plates. They were then mounted by means of a 6 mm thick spacer to form a liquid crystal cell such that the two electrode surfaces overlapped. The cell was then filled with a nematic liquid crystal mixture 18. Because of the different wall orientations a rotating cell having a 45° twist was created.

When the transmission direction of a polarizer 19 on the bottom of the cell was arranged to be parallel to the rubbing direction, an analyzer placed above the cell had to be rotated through 45° for maximum brightness. Further rotation of the analyzer through 90° produced maximum darkness of the cell.

When a sufficiently large voltage was applied to the two ITO electrodes, the liquid crystal molecules near the electrode's surface oriented themselves with their longitudinal axis perpendicular to the glass surface. In this zone the transmitted light retained the polarization direction predetermined by the polarizer—that is, the analyzer had to be adjusted parallel to the polarize for maximum brightness.

This cell was mounted on a PPN coated glass plate. A polarizer was mounted on the back of the cell such that its transmission direction was parallel to the rubbing direction of the glass plate near the polarizer. While the PPN layer was then exposed through the polarizer and cell, the cell remained active. After irradiation a liquid crystal layer was applied to the PPN layer by spin coating. When this liquid crystal layer was arranged below crossed polarizers it could be seen that the liquid crystal had been oriented. The orientation direction of the region exposed through the switched part of the liquid crystal cell differed by 45° from the direction in the other zones.

EXAMPLE 6

LCP Polarizer

As in Example 2, a PPN layer on a borosilicate glass plate was oriented by irradiation with polarized light parallel to the longitudinal edge in the left half and at 45° in the right half.

A mixture of cross-linkable LC monomers was doped with 3% of the following cyanoterphenyl molecule:

Cyanoterphenyl:

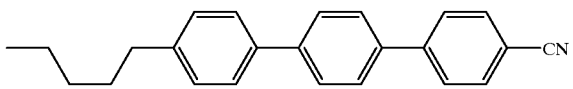

Cyanoterphenyl was chosen because maximum absorption occurs at the same wavelength as in the case of the PPN material used ($l_{max}$=310 nm). The doped mixture was dissolved in anisole to a 40% concentration and applied by spincoating to the exposed PPN layer at room temperature. The liquid crystals took over the orientation determined by the PPN exposure and retained such orientation after the subsequent cross-linking. The cyano-terphenyls had oriented themselves in accordance with the liquid crystal matrix, as was shown by the fact that the transmission measured at 310 nm parallel to the director was 20 times less than the transmission perpendicular to the director. Since the cross-linkable liquid crystal molecules used do not contribute to absorption in the range above 300 nm, this must be due to the dichroism of the cyanoterphenyls.

The resulting plate was mounted as a polarizing mask with the layer side downwards on a PPN coated glass plate and irradiated with isotropic UV light from the mask side. A liquid crystal layer was then applied to the PPN layer by spincoating. When the spincoated layer was placed under crossed polarizers, it could be seen that the liquid crystal had been oriented, the orientation directions of the left and right halves of the plate differing from one another by 45°.

The use of an LCP polarizing mask to produce orientation patterns in photosensitive materials does not require the use of an external polarizer. Polarization and the determination of the polarization plane is dealt with pixel by pixel by the polarizing mask.

EXAMPLE 7

Structurally Oriented Liquid Crystal Cell as Polarizing Mask

As in Example 2, a PPN layer on a borosilicate glass plate was oriented by irradiation with polarized light so as to be parallel in the longitudinal edge in the left half and 45° to the longitudinal edge in the right half.

A polyimide orientation layer was applied to a second borosilicate glass plate and rubbed with a cloth parallel to the longitudinal edge. The two glass plates were then combined to form a 6 mm thick LC cell such that the left half of the PPN plate together with the polyimide plate formed a parallel cell. Correspondingly, the orientation directions of the right PPN half and of the polyimide layer formed an angle of 45° to one another. The cell was then filled with a liquid crystal mixture doped with 1% cyanoterphenyl. When a polarizer was placed on the back of the polyimide-coated glass plate such that its transmission direction was parallel to the rubbing direction, the left half of the cell was in maximum darkness when the transmission direction of an analyzer above it was perpendicular to the transmission direction of the polarizer. However, the right half of the cell was at maximum darkness when the analyzer was rotated through 45°. The polarization plane of the incident light remained unchanged in the passage through the left half of the cell and was rotated through 45° in the passage through the right half.

This cell was mounted by way of its PPN side on another PPN-coated glass plate. The PPN layer was then irradiated with isotropic UV light through the cell, whereafter a liquid crystal layer was applied to the PPN layer by spincoating. When this layer was then placed below crossed polarizers, it could be seen that the liquid crystal had been oriented, the directions of orientation in the left half and right half of the plate differing from one another by 45°. This example shows that the exposure with a structurally oriented LCD polarizing mask requires no additional external polarizer.

EXAMPLE 8

Self-polarizing Switchable LCD Mask

Finger electrodes of ITO were prepared in an area of 1 cm² on a borosilicate glass plate. The width of the electrode paths, which were disposed parallel to the plate edge, was 20 mm and the distance between the paths was 40 mm. A polyimide layer was then applied on top and rubbed with a cloth at 45° to the direction of the electrode paths. A second borosilicate plate without any electrode was also coated with polyimide and rubbed at 45° to the longitudinal edge such that after assembly of the two plates a parallel cell arose. The between-plates distance was 6 mm. A nematic liquid crystal mixture having a negative dielectric anisotropy was doped with 1% cyanoterphenyl and charged into the cell. When an appropriately high voltage was applied to the finger, electrodes molecules near the electrode plate oriented themselves parallel to the electrode paths. Consequently, the liquid crystal had a structure with a 45° twist near the finger electrodes, whereas the parallel confirmation remained in the unswitched zone outside the electrodes.

The cell was then mounted on a PPN-coated glass plate. The PPN layer was then irradiated through the switched cell with isotropic UV light, whereafter a liquid crystal layer was applied to the PPN layer by spin coating. When the liquid crystal layer was then placed below crossed polarizers, it could be seen that the liquid crystal had been oriented and the orientation direction in the zone covered by the finger electrode area differed by 45° from the orientation direction in the outer zone. No external polarizer was needed in this construction either. The UV light is polarized by the doped liquid crystal mixture, the polarization plane being switchable through 45° by activation of the cell. It is therefore unnecessary to change the mask between transfers of different items of information.

By providing a liquid crystal arrangement with appropriate orientations and with a liquid crystal material layer having an appropriate thickness, the liquid crystal may be twisted zonewise through any desired angle between 0° and 180° and a multiple of 360°. The liquid crystal may also be twisted so that the twisting of at least two zones differs by (n * 90°+45°), or by (n * 180°+90°), n being a positive or negative integer or zero.

Upon reading the present specification, various alternative embodiments will become obvious to the skilled artisan. These variations are to be considered within the scope and spirit of the invention, which is only to be limited by the claims that follow and their equivalents.

What is claimed is:

1. A method of generating anisotropic properties in a photostructurable material comprising providing a polarization mask for producing linearly polarized light having a predetermined polarization direction from incident light and having a light input side and light output side, which comprises a plurality of zones which are delimited from each other on the light output side such that the plurality of zones produce a locally varying polarization pattern of different polarization directions on a light beam passing through the polarization mask; and radiating a light through the polarization mask to impress the locally varying polarization pattern on the light beam to concurrently irradiate the photostructurable material with the light beam and to generate the anisotropic properties in the photostructurable material.

2. The method according to claim 1, wherein at least two zones of said photostructurable material are simultaneously irradiated by portions of said light beam having different polarization directions.

3. The method according to claim 1, wherein said polarization mask and said photostructurable material are formed by separate members are connected with one another for irradiating said photostructurable material and are separated after the generation of said anisotropic properties.

4. The method as claimed in claim 1, wherein said photostructurable material is adapted for forming an orientation pattern on a orientation layer for a liquid crystal (cell).

5. A method according to claim 1 wherein at least some of the polarization directions of the polarization mask are varied before exposing a sample of photostructurable material.

6. A method for selectively exposing polarization-sensitive material to linearly polarized light of more than one polarization direction, said method comprising:

a) providing a polarization mask with an input side and an output side, the polarization mask having a plurality of zones which are delimited from each other on the light output side of the polarization mask such that the plurality of zones produce a locally varying polarization pattern of different polarization directions on a light beam passing through the polarization mask;

b) providing a polarization-sensitive material; and c) exposing the polarization mask to light such that the light enters the input side of the polarization mask and exits the output side of the polarization mask selectively exposing concurrently the polarization-sensitive material to linearly polarized light of more than one polarization direction.

7. The method according to claim 6, wherein said polarization-sensitive material is simultaneously exposed to said linearly polarized light of more than one polarization direction.

8. The method according to claim 6, wherein said polarization mask and said polarization-sensitive material are formed by separate members are connected with one another for exposing the polarization-sensitive material to said linearly polarized light and are separated after the exposition of the polarization-sensitive material.

9. The method according to claim 6, wherein said polarization-sensitive material is adapted for forming an orientation pattern of an orientation layer for a liquid crystal (cell).

10. A method according to claim 6 wherein at least some of the polarization directions of the polarization mask are varied before exposing a sample of the polarization-sensitive material.

* * * * *